Feb. 8, 1966   F. E. MARTINEZ   3,233,457
REGULATABLE FLOW METER UNIT FOR INTRAVENOUS FLUIDS
Filed Oct. 22, 1962   2 Sheets-Sheet 1
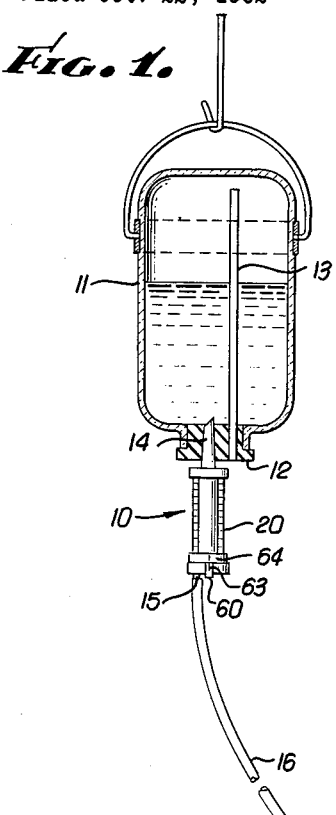
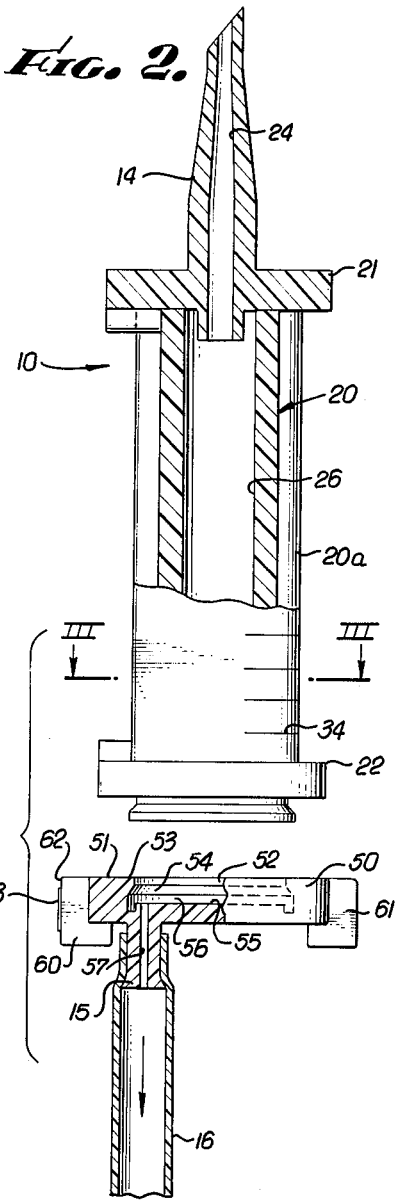
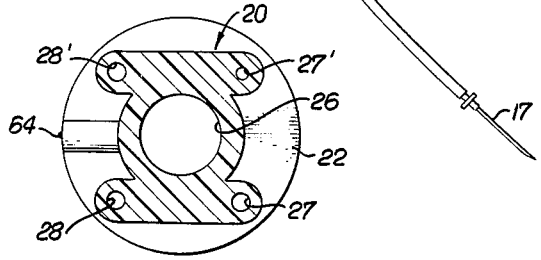
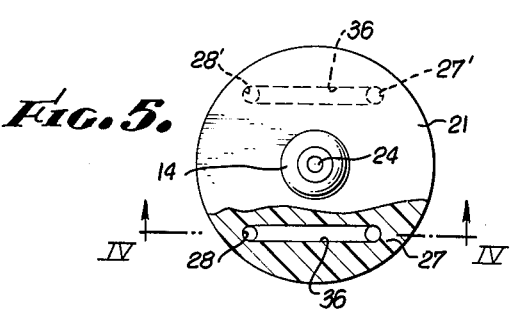
INVENTOR.
FRANK E. MARTINEZ
BY
Miketta and Glenny
ATTORNEYS.

Feb. 8, 1966      F. E. MARTINEZ      3,233,457
REGULATABLE FLOW METER UNIT FOR INTRAVENOUS FLUIDS
Filed Oct. 22, 1962      2 Sheets-Sheet 2
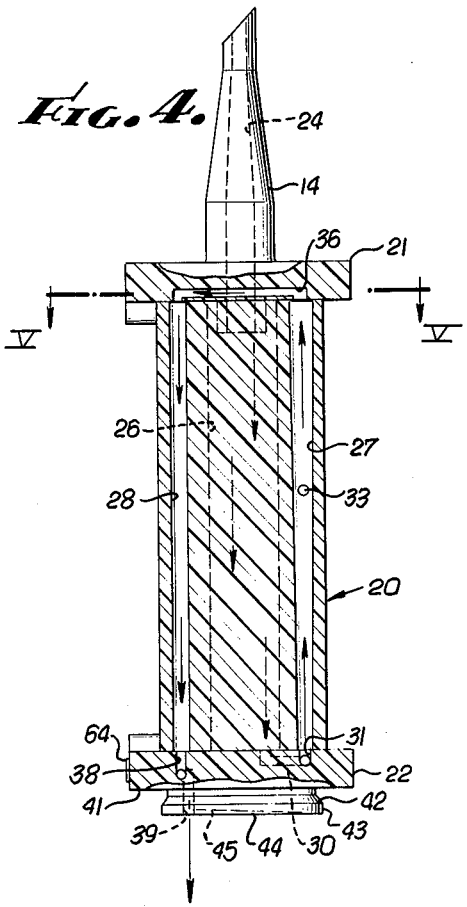
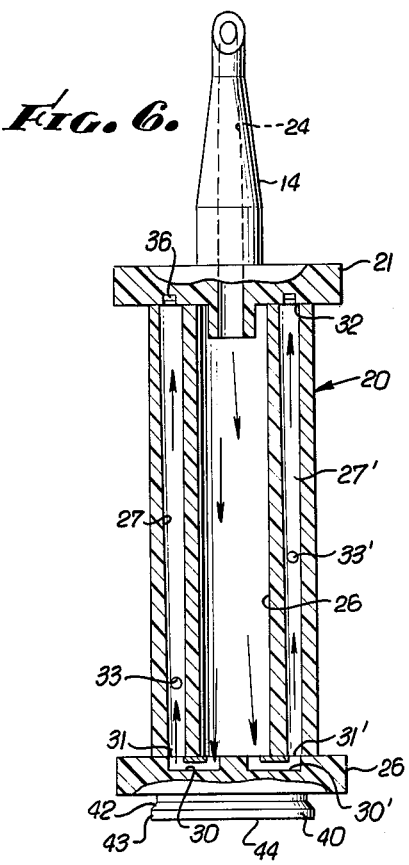
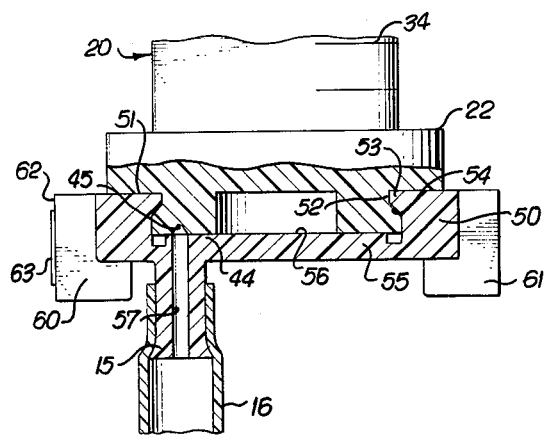
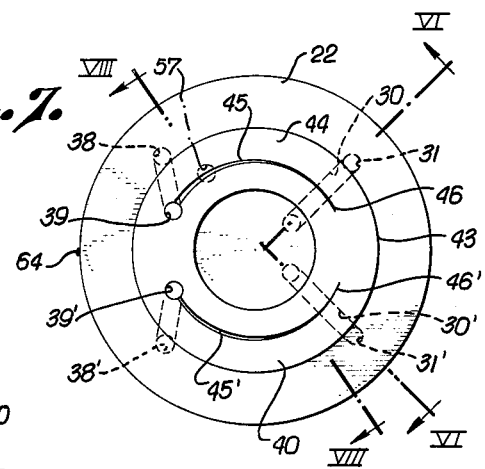
INVENTOR.
FRANK E. MARTINEZ
BY
Miketta and Glenny
ATTORNEYS.

United States Patent Office 3,233,457
Patented Feb. 8, 1966

3,233,457
REGULATABLE FLOW METER UNIT FOR
INTRAVENOUS FLUIDS
Frank E. Martinez, Covina, Calif., assignor, by mesne
assignments, to Resiflex Laboratory, Los Angeles, Calif.,
a corporation of California
Filed Oct. 22, 1962, Ser. No. 231,977
6 Claims. (Cl. 73—198)

This invention relates to a flow meter for fluids and, more particularly, to a novel, unitary regulatable flow meter for intravenous fluids wherein the flow rate at which fluid is administered to a patient may be precisely and accurately controlled.

In prior proposed devices for controlling flow from an intravenous fluid source, a suitable chamber was provided adjacent such source to receive fluid therefrom and a discharge tube was connected to the chamber for conveying the fluid to an intravenous needle for injection of the fluid at a venipuncture point. Somewhere along the length of the discharge tube, a tube clamp was installed for regulating and varying the internal flow area of the tube and thus, the rate of flow of fluid passing through the tube to the needle. Such tube clamp flow control was used even where well-known types of calibrated flow meters were employed at the chamber; see for example: 3,049,918; 3,034,504; 1,889,705.

Intravenous fluid may be administered to a patient at a predetermined rate depending upon the condition of the patient and the type and characteristics of the fluid used. The rate of fluid flow may thus be varied from a few drops per hour to many drops per minute or per hour and such selected rate of fluid flow may be required to be maintained for long periods of time. Visually counting drops per minute was one way of determining rate of flow in prior devices. Such method was limited in its accuracy when a slow rate of flow was desired. In prior devices, using a calibrated flow meter, initial selection of the rate of flow is facilitated, but setting and maintaining a tube clamp in selected position for a long period of time is not readily accomplished and the rate of fluid flow may vary.

Moreover, clamps used on intravenous tubing are generally inaccurate because through cold flow and stress-relief of the tube and clamp materials used, such clamps cannot maintain a constant internal flow area throughout the time required for administration. In addition, a discharge tube may be of relatively considerable length (for example, five feet) and a tube clamp positioned on said tube is subject to disturbance by movement of the tube or by inadvertent contact with an attendant. Disturbance of such a clamp could cause fluid discharge to become either too great or too little. As a result, such prior constructions required continuous and frequent attention to make certain that the fluid flow rate was proper.

Moreover, prior constructions embodying flow meter features were limited to use of one metering chamber, and the dimensional characteristics of the one metering chamber limited its use to a specific single range of flow rates. If the flow rate selected was not within such single range, a different flow meter device was required.

The present invention contemplates a unitary, compact housing or body means serving as a multi-range flow meter and carrying a valve means constructed and arranged to afford selective flow areas for precisely determining and controlling the flow rate of fluid through a fluid transport tube to an intravenous needle means. The present invention contemplates such a regulatable, unitary flow meter wherein a single housing means includes more than one flow meter means and whereby two or more flow meters with calibrations for different flow rates may be employed for the selective administration of different types of intravenous fluids over an extended range of flow rates with only a minimum or insignificant change in size of the housing means. The present invention contemplates such a multi-range regulatable flow meter construction including a valve means provided with means for selecting only one of the fluid flow meters and for selecting a flow area whereby fluid flow control is maintained over an extended range of flow rates. Such meter selecting means automatically renders inoperative other flow meters in the housing means.

The principal object of the present invention is to design and provide a regulatable flow meter for fluids which is compact, unitary, simple to operate, and extremely effective in the precise control and administration of intravenous fluids.

An object of the present invention is to disclose and provide a flow meter for fluids wherein a flow meter housing means carries a valve means for controlling flow of fluid through the flow meter.

Another object of the present invention is to disclose and provide a flow meter housing constructed and arranged so as to provide chamber means comprising one or more sets of metering and outlet chambers and a single inlet chamber common to each of metering chambers.

Another object of the present invention is to disclose and provide a flow meter housing or body means wherein one or more sets of metering and outlet chambers are provided communication with a common inlet chamber and wherein each outlet chamber communicates with a discharge port and a variable area passageway or groove with which may be selectively associated a valve port on a valve member rotatably associated with one end of the housing means.

A still further object of the invention is to disclose and provide a valve means constructed and arranged to be associated with a flow meter housing means for selectively varying the rate of flow of fluid through the flow meter and from a discharge connector on the valve means.

Various other objects and advantages of the present invention will be readily apparent to those skilled in the art from the following description of the drawings in which an exemplary embodiment of the invention is shown.

In the drawings:

FIG. 1 is a side elevational view of a flow meter embodying this invention associated with an intravenous fluid container and intravenous needle and tube.

FIG. 2 is an enlarged exploded, elevational view, partly in section, of the flow meter shown in FIG. 1, the section being taken in a plane longitudinally bisecting the flow meter.

FIG. 3 is a transverse sectional view taken in the plane indicated by line III—III of FIG. 2.

FIG. 4 is a sectional view taken in the plane indicated by line IV—IV of FIG. 5.

FIG. 5 is a top end view, partly in section, as taken in the plane indicated by line V—V of FIG. 4.

FIG. 6 is a sectional view taken in the planes indicated by lines VI—VI of FIG. 7.

FIG. 7 is an end view taken from the bottom of FIG. 4.

FIG. 8 is a sectional view taken in the plane indicated by lines VIII—VIII in FIG. 7 with the valve member in assembly therewith.

A regulatable flow meter for intravenous fluids embodying this invention is generally indicated at 10 in FIG. 1. The regulatable flow meter 10 may be associated with a supply bottle 11 containing intravenous fluid (or other fluids) and suspended in inverted position by suitable well-known means (not shown). Bottle 11 may be provided with a stopper 12 having a vent tube 13 extending into proximity with the upper end wall of the bottle for venting the bottle. The stopper 12 may be pierced by an inlet device or connector 14 carried by flow meter 10. The bottom end of flow meter 10 is provided with an outlet device or connector 15 which is associated with a suitable length of discharge tube 16 for conducting fluid to an intravenous-type needle 17. The inlet connector 14 may be formed as a hollow spike with a tapered shape and truncated end to facilitate piercing of stopper 12. The inlet connector may also be designed of any suitable external contour to facilitate entry into container stopper inlet diaphragm without coring the cross-section required for entry.

Flow meter 10 principally comprises a unitary flow meter housing or body means 20 preferably formed of a transparent material such as a flexible or rigid plastic material or glass material having inert, non-toxic, readily sterilizable characteristics. Suitable materials include acrylic, polystyrene, or vinyl plastics. Housing means 20 includes an elongated housing or body portion 20a provided with circular or disk-like end portions 21 and 22. The end portions may be integrally formed with the body means or may be separately formed and bonded thereto by suitable bonding agents and adhesives. Inlet connector 14 may be bonded to or may be integral with end portion 21 and is provided with a passageway 24 extending into housing portion 20a.

Housing means 20 comprises chamber means which include a coaxial central elongated drip or inlet chamber 26 extending for approximately the length of the housing portion 20a. Associated with inlet chamber 26 may be one or more sets of metering and outlet chambers 27 and 28 and 27' and 28'. For brevity, reference numerals with prime sign will be used to designate like parts of the sets of chambers and associated passageways. Each set of metering and outlet chambers 27, 27' and 28, 28' lie in parallel relation to the axis of inlet chamber 26 and, in this example, the axes of metering chambers and outlet chambers 27, 27' and 28, 28' of each set are disposed radially outwardly from inlet chamber 26 and may subtend an angle with respect to the axis of the inlet chamber of approximately 90°. Each set of chambers 27, 27' and 28, 28' lie on opposite sides of common inlet chamber 26.

Inlet chamber 26 may be of uniform diameter throughout its length. At bottom end portion 22, a passageway 30 is provided for communication of fluid from inlet chamber 26 to metering chamber 27. Similarly, a passageway 30' is provided for metering chamber 27'.

Metering chamber 27 is of well-known tapered configuration and is provided with a progressively increasing cross-sectional flow area from its bottom at 31 to its top at 32. A ball-type restrictor element 33 movable in the tapered metering chamber 27 may be made of suitable material such as a soda lime glass tinted to a selected color for facilitating observation thereof during flow of fluid. The diameter of restrictor element 33 may be approximately that of the diameter of the bottom end 31 of chamber 27 so that the restrictor element will not become lodged in passageway 30. As the restrictor element is raised by fluid flowing upwardly in chamber 27, the rate of flow of said fluid will determine the position of element 33 and such flow rate may be readily calibrated and designated by suitably spaced indicia marks 34 provided on the external surface of the housing portion 20a. Element 33 and indicia 34 may be readily observed because metering chamber 27 is formed adjacent an exterior transparent wall of housing means 20.

The tapered metering chamber 27' is likewise constructed and provided with a ball restrictor element 33'; however, the cross-sectional flow area of bottom end 31' of chamber 27' may be slightly greater than that of end 31 of metering chamber 27 and somewhat smaller than 31 of metering chamber 27 so that some overlap in the top end 32 of chamber 27 so that some overlap in flow rate range is afforded. Thus, in a single unitary flow meter housing means, there are provided metering chambers 27, 27' capable of measuring flow rates over an exceptionally wide range, such range being approximately twice the length of each metering chamber. Thus, by use of a common inlet chamber 26 for passage of fluid to each metering chamber 27, 27', a multi-range flow meter of extended performance is provided without increasing the overall length of flow meter 10. In this respect, it will be understood that while the present example shows only two sets of metering and outlet chambers, more than one or two sets of such chambers may be provided by slightly increasing the overall diameter of housing means 20 to accommodate additional sets of metering and outlet chambers adjacent the external walls of the flow meter housing.

Metering chamber 27 may be connected with outlet chamber 28 by a fluid passageway 36 provided in top end portion 21. The flow area of passageway 36 is large enough as to not restrict fluid flow when ball element 33 is at the widest top end 32 of metering chamber 27.

Outlet chamber 28 may be of uniform cross-sectional area throughout its length and terminates in an outlet or discharge passageway 38 in end portion 22, said passageway 38 defining a discharge port 39 at the end of housing means 20.

Similarly, the set of chambers 27', 28' is provided with passageway 36', discharge passageway 38', and discharge port 39'.

Valve means are provided at end portion 22 of housing means 20 for receiving fluid from discharge port 39. In this example, the valve means includes an annular embossment wall 40 projecting downwardly from annular end face 41 of end portion 22. The annular embossment wall 40 may be provided with a radially outwardly extending flange 43 having a inwardly tapered or beveled annular surface 42 for a purpose hereafter described. Embossment wall 40 also includes an axially directed face 44 provided with a curved valve groove 45 (FIG. 7) having a cross-sectional flow area adjacent port 39 approximately that of port 39 and then progressively diminishing in flow area until groove 45 terminates at 46 at the plane of face 44. Flow area may be varied by changing the depth of the groove and by modifying its width.

Similarly, discharge port 39' communicates with a discharge passageway 38' and with a curved valve groove 45' which progressively diminishes in flow area until it terminates at 46' at the plane of face 44. It should be noted that discharge ports 39 and 39' are spaced apart on opposite sides of a diametrical plane passing therebetween and, similarly, ends 46, 46' of grooves 44, 44' are likewise spaced apart. Thus, between ports 39, 39' and groove ends 46, 46' are arcuate segments of annular face 44 which are uninterrupted.

The valve means also includes a valve member 50 made of a resilient or elastomeric plastic material, such as polyethylene which may be of different composition than the material of housing means 20 and face 44 for providing a sliding, sealing interfacial contact with face 44. Valve member 50 includes an annular end face 51 adapted to slidably seat tightly against annular face 41 on end portion 22. Valve member 50 has a central opening 52 defined by a radially inwardly extending lip 53 provided with an outwardly beveled face 54 for interlocking engagement with flange 43 so that valve member 50 is effectively retained in assembly with housing means 20. Since the material of valve member 50 is relatively soft and resilient as compared to the rigid material of housing means 20, the valve member 50 may be readily assembled with the housing means by urging lip 53 of valve member 50 over flange 43. The resiliency of the material of the valve member not only holds valve member 50 in assembly with housing means 20, but also provides a slidable, sealing fit therewith. Valve member 50 may be thus readily rotatably mounted on end portion 22.

Valve member 50 also includes a central embossment 55 of approximately the same diameter as embossment wall 44, said embossment 55 having a smooth, planar face 56 adapted to sealingly engage annular face 44 and to define with groove 45 a variable cross-sectional area passageway. The valve member 50 is provided with a valve port 57 spaced from the axis of the valve member the same raidal distance as the radius about which valve grooves 45, 45' are formed. The valve port 57 communicates with outlet device or connector 15 which provides fluid connection to tube 16.

Valve member 50 also includes diametrically opposite, radially extending tabs 60 and 61, which are formed on the same diameter as that on which the valve port 57 is provided. Edge 62 of one tab may carry a reference mark 63 for designating location of valve port 57 and end portion 22 may carry a reference mark 64 for designating location of a dead space and valve shutoff position. The marks 63, 64 may be alignable between metering chambers 27, 27' so that rotation of the valve member 50 toward the selected metering chamber will cause flow of fluid through that chamber. Other reference marks or indicia may be used to correlate the position of valve port 57 with valve grooves 45, 45'.

Upon rotation of valve member 50, valve port 57 may be selectively moved into fluid communication with either discharge port 39 or 39', and may be moved along either valve groove 45, 45' in order to vary flow area and rate of flow of fluid discharged, or may be moved into the uninterrupted or dead spaces between ports 39, 39' or the end of valve grooves 46, 46' so that fluid discharge from the flow meter will be stopped.

It will thus be understood that a unitary, multi-range flow meter with flow control means of compact design and construction has been provided. Moreover, the present flow meter may be adapted, by simply rotating the valve member, to change flow rate of fluid from a rate suitable for pediatric use to a rate suitable for adult use. The meter of the present invention provides for accurate measurement and calibration of flow rate and particularly for maintenance of such rate over extended periods of time because the flow control valve is located at the source of fluid and not at some intermediate point along the length of discharge tube. Unintentional change or disturbance of the flow control setting is thus substantially eliminated.

In the exemplary embodiment of the invention described above, the valve means has been located at the bottom of the housing to receive fluid from the discharge chamber and control of fluid flow is directly indicated in the metering chamber. Such valve means may be located on the housing means on the discharge side of the metering chamber to provide such direct control and reading of the rate of flow, particularly when such flow is intermittent, that is, drop by drop, as distinguished from a continuous flow stream. In the latter instance the valve means may be on the upstream side of the flow metering chamber and on the housing. However, such latter conditions of use, continous stream, are not normal for intravenous administration of fluid.

Modifications and changes may be made in the exemplary embodiment described above which come within the spirit of this invention, and all changes coming within the scope of the appended claims are embraced thereby.

I claim:

1. A regulatable flow meter for intravenous fluids comprising: a unitary, transparent plastic body means provided with end portions, one end portion having an inlet connector for association with a container of intravenous fluids for gravity flow of fluid into the body means; said body means being provided with chamber means including an inlet chamber disposed along the axis of the body means and in communication with the inlet connector, one or more sets of metering and outlet chambers radially outwardly disposed with respect to the inlet chamber; said body means including a passageway communicating the inlet chamber with the metering chamber at the other end portion, and a passageway communicating the metering chamber to the outlet chamber at said one end portion; flow indicating means associated with each metering chamber; and valve means carried by said other end portion of the body means, said valve means including an annular embossment having an axially directed face provided with a discharge port in common with each outlet chamber, a valve member rotatably mounted on said other end portion and having a valve port selectively cooperably positionable with respect to each discharge port, said valve member having an embossment with a face in sealing, slidable engagement with said axially directed face on said annular embossment, said axially directed embossment face having a valve groove in communcation with each associated discharge port and progressively diminishing in flow area in a direction away from said discharge port whereby rotation of said valve member positions said valve port with respect to an associated valve groove for regulating discharge of fluid from said valve means.

2. A flow meter as stated in claim 1 wherein said valve member includes annular lip means for interlocking engagement with an annular flange means carried on said other end portion.

3. A flow meter as stated in claim 1 wherein said valve member includes an outlet connector in communication with said valve port, and a projection extending in radial alignment with said outlet connector for indicating the postion of said valve port with respect to a discharge port.

4. A flow meter as stated in claim 1 wherein said metering chamber is disposed adjacent an external wall portion of said body means and said external wall portion is provided with indica, said flow indicating means including a restrictor element movable in said metering chamber.

5. A valve means for use with a device for administering intravenous fluid, said device having a chamber for fluid, in combination:

an end wall portion closing one end of said chamber and having an annular embossment face and having a discharge passage and a discharge groove in said face for fluid;

a rotatable valve member having a valve port positionable with respect to said discharge passage and having a sealing face in sliding contact with said embossment face;

and annular flange means on said end wall portion and and annular lip means on said valve member cooperable therewith for rotatably mounting said valve member with said embossment face and sealing face in cooperable sliding contact.

6. In combination with a device for administering intravenous fluid including a chamber having an open end, a valve means comprising a closure member for said chamber open end including an annular embossment having an axially directed face provided with a discharge port in communication with said chamber, a valve member rotatably mounted on said closure member and having a valve port selectably cooperably positionable with respect to said discharge port, said valve member having an annular face in sealing slidable engagement with said axially directed face on said closure member, said axially directed face having a valve groove in communication with said discharge port and curved about the axis of said rotatably mounted valve member and progressively diminishing in flow area whereby rotation of said valve member positions said valve port with respect to said groove for regulating discharge of fluid from said valve means; and means for rotatably mounting the valve member on the closure member including an annular flange means on said closure member and annular lip means on said valve member for interlocking engagement therewith.

References Cited by the Examiner

UNITED STATES PATENTS

| 1,011,686 | 12/1911 | Westaway | 251—208 X |
|---|---|---|---|
| 1,911,044 | 5/1933 | Thrasher | 251—206 X |
| 1,982,754 | 12/1934 | Peterson | 251—206 X |
| 2,252,883 | 8/1941 | Everson | 73—209 |
| 2,778,223 | 1/1957 | Kimbrell | 73—209 |
| 3,049,918 | 8/1962 | Sparkuhl | 73—209 |

FOREIGN PATENTS

| 733,905 | 7/1955 | Great Britain. |
|---|---|---|

RICHARD C. QUEISSER, *Primary Examiner.*

DAVID SCHONBERG, *Examiner.*